(12) United States Patent
Cornell

(10) Patent No.: US 6,363,219 B1
(45) Date of Patent: Mar. 26, 2002

(54) ONE-TIME-USE CAMERA WITH BELT-DRIVE CONNECTION BETWEEN MANUAL FILM WINDER AND FILM WINDING SPOOL

(75) Inventor: David J. Cornell, Caledonia, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/639,862

(22) Filed: Aug. 16, 2000

(51) Int. Cl.[7] ............................. G03B 1/00; G03B 17/02
(52) U.S. Cl. ......................... 396/6; 396/411; 396/413
(58) Field of Search ..................... 396/6, 411, 387, 396/394, 413, 511, 512

(56) References Cited

U.S. PATENT DOCUMENTS

| | | | | |
|---|---|---|---|---|
| 1,144,934 A | * | 6/1915 | Cutler ........................ 396/416 |
| 2,026,000 A | * | 12/1935 | Powers ....................... 396/511 |
| 2,220,917 A | | 11/1940 | Schwartz ....................... 95/34 |
| 2,578,283 A | | 12/1951 | Bornemann et al. ........... 95/34 |
| 2,879,704 A | | 3/1959 | Winkler et al. ................ 95/31 |
| 3,728,949 A | | 4/1973 | Edwards ........................ 95/31 |
| 3,736,015 A | | 5/1973 | Dierks et al. ............... 242/71.2 |
| 4,474,443 A | * | 10/1984 | Komatsuzaki et al. ...... 396/415 |
| 4,821,059 A | | 4/1989 | Nakanishi et al. .......... 354/400 |
| 5,215,273 A | * | 6/1993 | Greene ......................... 242/55 |
| 5,640,637 A | * | 6/1997 | Stephenson, III ........... 396/411 |
| 5,911,088 A | * | 6/1999 | Higashihara et al. ....... 396/387 |
| 5,923,905 A | | 7/1999 | Solomon ....................... 396/6 |
| 6,009,276 A | * | 12/1999 | Balling .......................... 396/6 |
| 6,088,528 A | * | 7/2000 | DeCecca et al. ............... 396/6 |

\* cited by examiner

Primary Examiner—Christopher E. Mahoney
(74) Attorney, Agent, or Firm—Roger A. Fields

(57) ABSTRACT

A one-time-use camera includes a film cartridge with a film winding spool that is rotatable to wind a filmstrip into the film cartridge, a manually rotatable film winding thumbwheel having an axis that is parallel to an axis of the film winding spool, and a rotatable endless belt rotationally engaging the film winding thumbwheel and the film winding spool to permit rotation of the thumbwheel to rotate the spool. Since the endless belt permits the axis of the film winding thumbwheel to be spaced from the axis of the film winding spool, rather than being coaxial, the thumbwheel can protrude substantially from a narrow opening in a rear cover part to allow it to be easily grasped in order to be rotated.

8 Claims, 3 Drawing Sheets

ONE-TIME-USE CAMERA WITH BELT-DRIVE CONNECTION BETWEEN MANUAL FILM WINDER AND FILM WINDING SPOOL

FIELD OF THE INVENTION

The invention relates generally to the field of photography, and in particular to cameras. More specifically, the invention relates to a disposable single-use or one-time-use camera with a belt-drive connection between a manual film winder and a film winding spool.

BACKGROUND OF THE INVENTION

Film and cameras that are all in one, commonly referred to as disposable single-use or one-time-use cameras, have become well known. The one-time-use camera is a simple point-and-shoot type camera comprising an opaque plastic main body part that supports a conventional film cartridge in a cartridge receiving chamber, an unexposed film roll prewound from the film cartridge onto a film supply spool in a film supply chamber, a fixed-focus taking lens, a film metering mechanism with a rotatably supported metering sprocket that engages the filmstrip, a manually rotatable film winding thumbwheel rotatably engaged with a film winding or take-up spool inside the film cartridge, a singleblade shutter, a manually depressible shutter release button, an exposure counter wheel that has a numerical series of evenly spaced exposure count indicia and is incrementally rotated to successively view the exposure count indicia, an anti-backup pawl that engages the exposure counter wheel to prevent its reverse rotation, a direct see-through viewfinder having front and rear viewfinder lenses, and in some models an electronic flash. A pair of opaque plastic front and rear cover parts house the main body part between them to complete the camera. The rear cover part connects to the main body part and/or to the front cover part to make the main body part light-tight. A decorative cardboard outer box or label at least partially covers the front and rear cover parts and has respective openings for the taking lens, etc.

After each picture is taken with the one-time-use camera, the photographer manually rotates the thumbwheel in a film winding direction to similarly rotate the film winding spool inside the film cartridge. This winds an exposed frame of the filmstrip from a rear backframe opening in the main body part into the film cartridge and advances an unexposed frame of the filmstrip from the unexposed film roll to the rear backframe opening. The rewinding movement of the filmstrip the equivalent of slightly more than one frame width rotates the metering sprocket in engagement with the filmstrip to decrement the exposure counter wheel to its next lower-numbered indicia and to pivot a metering lever into engagement with the thumbwheel in order to prevent further manual rotation of the thumbwheel in the film winding direction. Manually depressing the shutter release button to take another picture pivots the metering lever out of engagement with the thumbwheel to permit renewed rotation of the thumbwheel in the film winding direction. When the maximum number of exposures available on the filmstrip have been made, and the filmstrip is completely wound into the film cartridge, the one-time-use camera is given to a photofinisher who separates the rear cover part from the main body part and removes the film cartridge with the exposed filmstrip from the cartridge receiving chamber. Then, he removes the exposed filmstrip from the film cartridge to develop the latent images and make prints for the customer.

Problem

Typically, the film winding thumbwheel is rotatably supported on top of the main body part, above the cartridge receiving chamber, and it has a depending coaxial stem in coaxial engagement with a protruding end portion of the film winding spool inside the film cartridge. This construction allows the thumbwheel to radially protrude slightly from an elongate narrow opening in the rear cover part in order to be manually rotated. However, the thumbwheel may not protrude sufficiently from the narrow opening for some people to be able to readily grasp it.

SUMMARY OF THE INVENTION

A one-time-use camera comprising:

a film cartridge with a film winding spool that is rotatable to wind a filmstrip into the film cartridge;

a manually rotatable film winding thumbwheel having an axis that is parallel to an axis of the film winding spool; and a rotatable endless belt rotationally engaging the film winding thumbwheel and the film winding spool to permit rotation of the thumbwheel to rotate the spool.

Since the endless belt permits the axis of the film winding thumbwheel to be spaced from the axis of the film winding spool, rather than being coaxial, the thumbwheel can protrude substantially from a narrow opening in a rear cover part to allow it to be easily grasped in order to be rotated.

DETAILED DESCRIPTION OF THE INVENTION

The invention is disclosed as being embodied preferably in a disposable one-time-use camera. Because the features of a one-time-use camera unit are generally known, the description which follows is directed in particular only to those elements forming part of or cooperating directly with the disclosed embodiment. It is to be understood, however, that other elements may take various forms known to a person of ordinary skill in the art.

Figure 1:
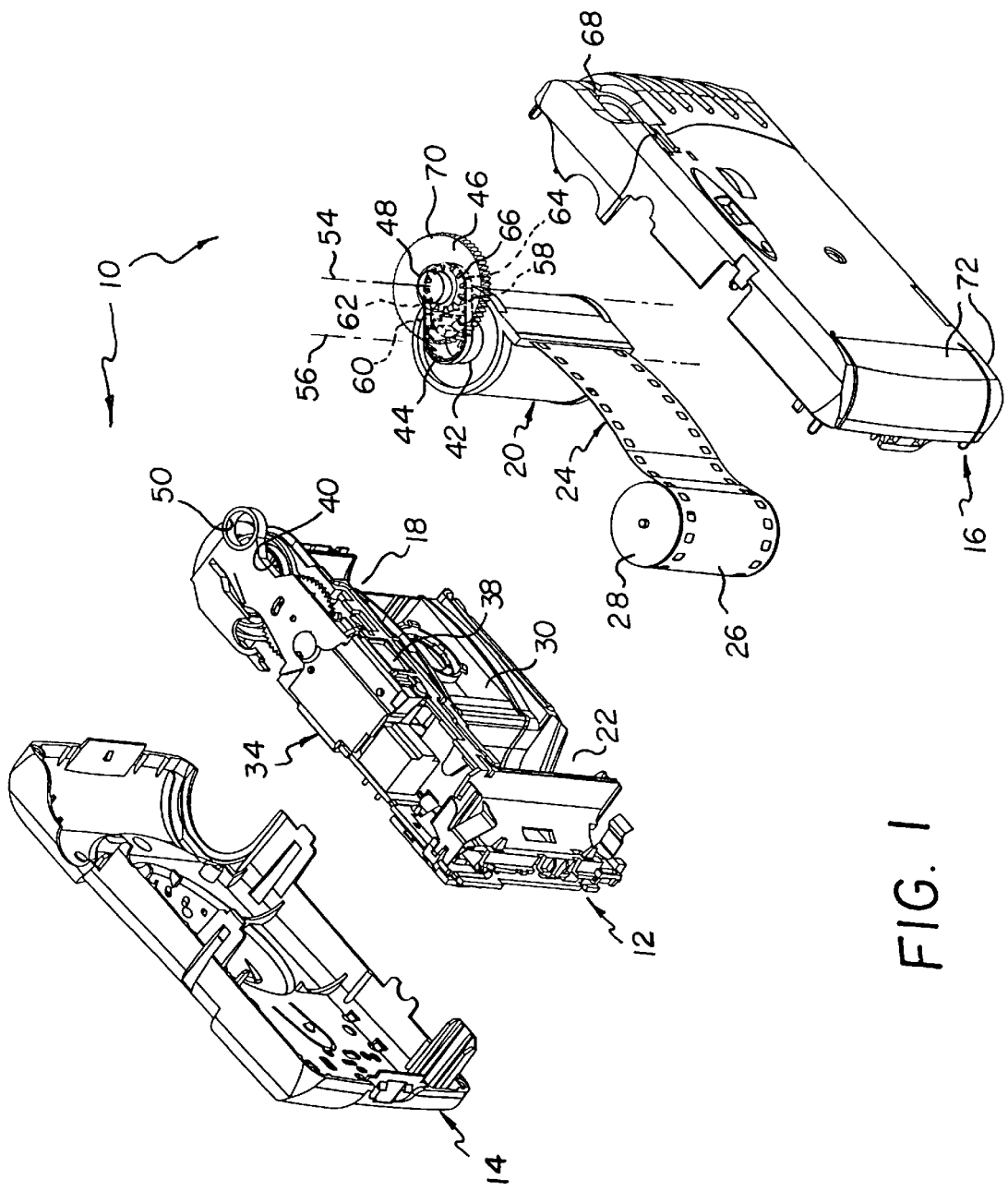
FIG. 1 is an exploded rear perspective view of a one-time-use camera with a belt-drive connection between a manual film winding thumbwheel and a film winding spool, according to a preferred embodiment of the invention.
Figure 2:
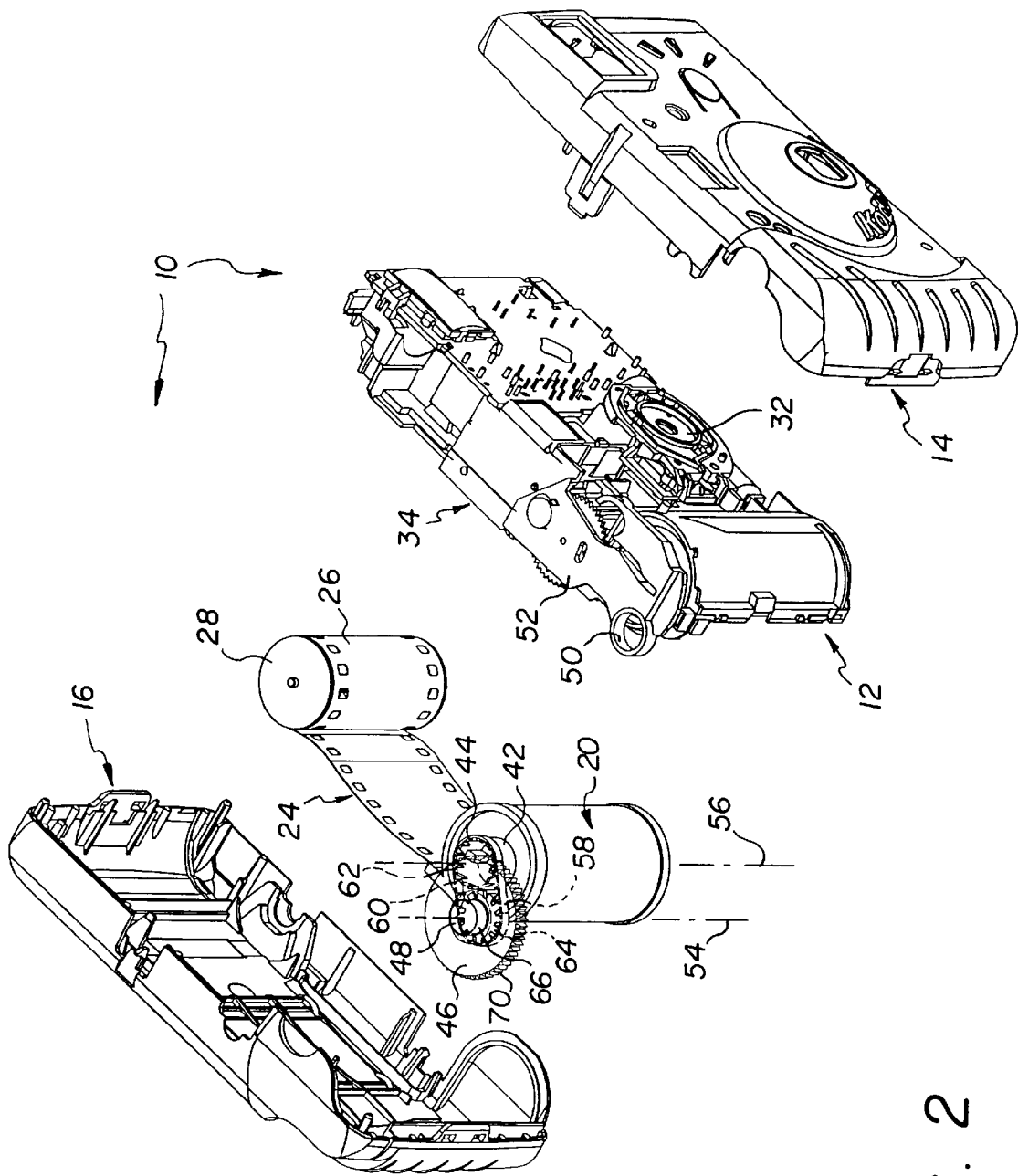
FIG. 2 is an exploded front perspective view of the camera.

Referring now to the drawings, FIGS. 1 and 2 show a disposable one-time-use camera 10 including a plastic opaque main body part 12, a plastic opaque front cover part 14, and a plastic opaque rear cover part 16. The front cover part 14 and the rear cover part 16 house the main body part 12 between them and are connected releasably to one another and to the main body part 12 via known hook-in-hole connections.

As is typical, the main body part 12 has a rearwardly open cartridge receiving chamber 18 for a conventional film cartridge 20 and a rearwardly open film supply or film roll chamber 22. See FIG. 1. During manufacture, a filmstrip 24 is prewound from the film cartridge 20 into an unexposed film roll 26 on a film supply spool 28 which is placed in the film supply chamber 22. A rearwardly open backframe opening 30 is located between the cartridge receiving chamber 18 and the film supply chamber 22 for exposing successive frames of the filmstrip 24 when ambient light is received through a front taking lens 32 on the main body part 12. See FIG. 1.

A known optical viewfinder 34 is mounted on top of the main body part 12 and has a pair of front and rear viewfinder lenses 36 and 38 for viewing a subject to be photographed. See FIGS. 1 and 2.

The main body part 12 has a top opening 40 above the cartridge receiving chamber 18. See FIG. 1. A film winding or take-up spool 42 inside the film cartridge 20 has an erect spool end portion 42 that longitudinally extends through the top opening 40 to project slightly above (from) the top opening. The spool end portion 42 has an evenly spaced series of end-notches 44 (separated by respective teeth). See FIG. 3.

A film winding thumbwheel 46 has a top integral center-bearing 48 that is rotatable within a support opening 50 in a top plate 52 on the main body part 12 in order to permit the thumbwheel to be manually rotated. See FIGS. 1 and 2. The film winding thumbwheel 46 has an axis 54 that is parallel to an axis 56 of the film winding spool 42 and is spaced sufficiently from the axis of the film winding spool to lie wholly beyond the film cartridge 20. See FIG. 3. A rotatable endless belt 58 has an inner side 60 with evenly spaced teeth 62 that can be successively received in the end-notches 44 in the spool end portion 42 and that can successively engage evenly spaced teeth 64 on a coaxial integral gear 66 of the thumbwheel. The endless belt 58 has one axis 54 that is coaxial with the axis 54 of the film winding thumbwheel 46 and another axis 56 that is coaxial with the axis 56 of the film winding spool 42. Thus, the endless belt 58 serves to rotationally engage the gear 66 about the axis 54 and to rotationally engage the spool end portion 42 about the axis 56 to permit manual rotation of the film winding thumbwheel 46 to rotate the film winding spool 42.

Figure 3:
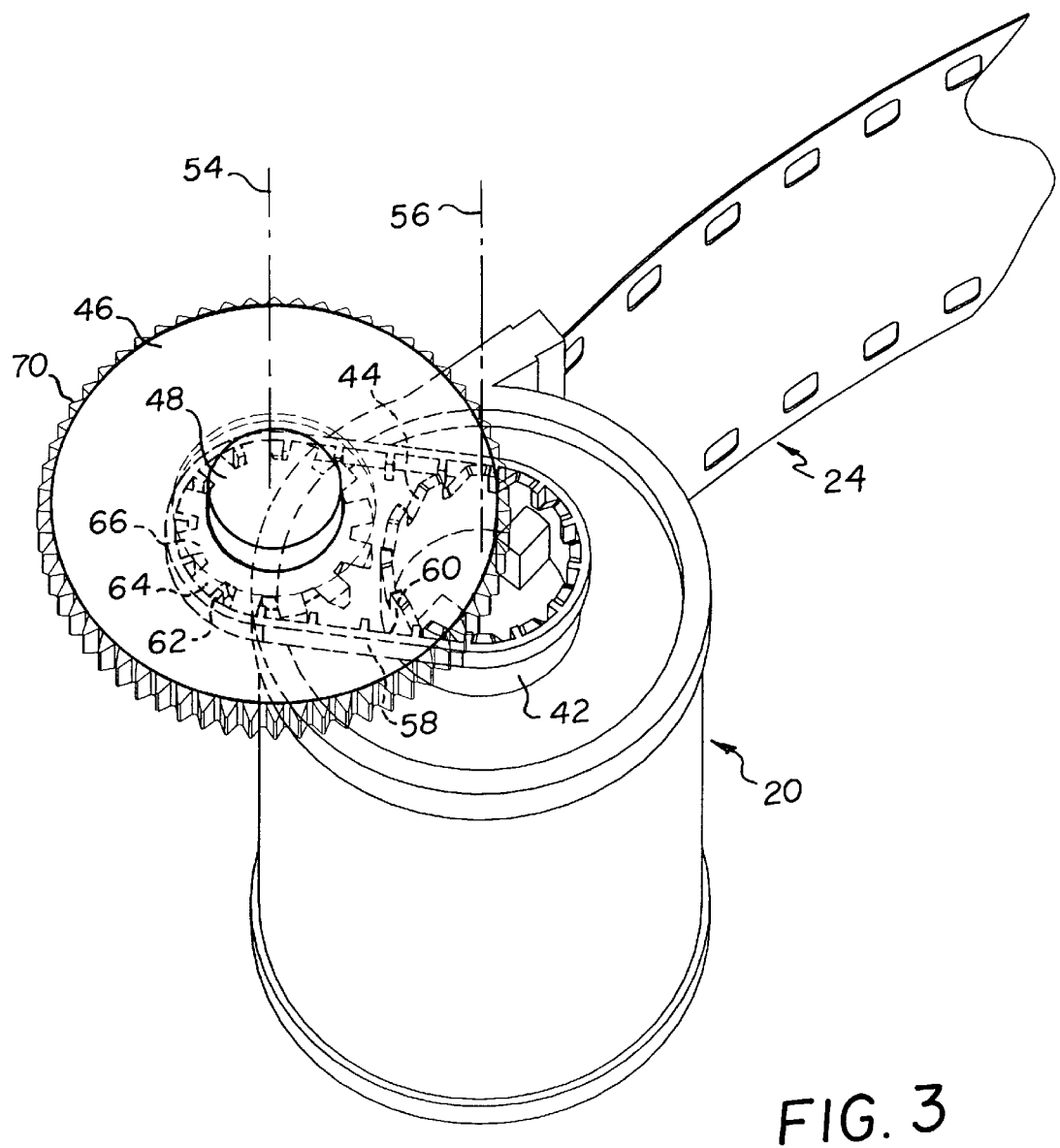
FIG. 3 is a rear perspective view of the belt-drive connection between the film winding thumbwheel and the film winding spool.

The film winding thumbwheel 46 radially protrudes substantially from an elongate narrow opening 68 in the rear cover part 16 in order to be manually grasped or fingered at its periphery 70 to incrementally rotate the thumbwheel in a film winding direction, i.e. counter-clockwise in FIGS. 1–3, to similarly rotate the film winding spool 42. This is done in order to wind an exposed frame of the filmstrip 24 from the backframe opening 30 into the film cartridge 20 after each film exposure, and to move a fresh frame of the filmstrip from the unexposed film roll 26 to the backframe opening. Each time the filmstrip 24 is advanced slightly greater than a frame width, a known metering lever or other known metering device (not shown) engages the periphery 70 of the film winding thumbwheel 46 to prevent rotation of the thumbwheel. The metering lever is disengaged from the periphery 70 as an incident of the film exposure.

When the filmstrip 24 is wound completely into the film cartridge 20, a rear/bottom portion 72 of the rear cover part 16 which at least partially covers the cartridge receiving chamber 18 is disengaged from the main body part 12 to permit the film cartridge to be removed from the cartridge receiving chamber.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. front cover part
16. rear cover part
18. cartridge receiving chamber
20. film cartridge
22. film supply chamber
24. filmstrip
26. unexposed film roll
28. film supply spool
30. backframe opening
32. front taking lens
34. optical viewfinder
36. front viewfinder lens
38. rear viewfinder lens
40. top opening
42. film winding spool/spool end portion
44. end-notches
46. film winding thumbwheel
48. center-bearing
50. support opening
52. top plate
54. axes
56. axes
58. endless belt
60. inner side
62. teeth
64. teeth
66. gear
68. narrow opening
70. periphery
72. rear/bottom portion

What is claimed is:

1. A one-time-use camera comprising:

a film cartridge with a film winding spool that is rotatable to wind a filmstrip completely into said film cartridge by winding the filmstrip onto said film winding spool;

a manually rotatable film winding thumbwheel having an axis that is parallel to an axis of said film winding spool; and a rotatable endless belt rotationally engaging said film winding thumbwheel and said film winding spool to permit rotation of said thumbwheel to rotate said spool in order to wind the filmstrip completely into said film cartridge.

2. A one-time-use camera as recited in claim 1, wherein said film winding spool has a spool end portion that protrudes from said film cartridge, and said endless belt rotationally engages said spool end portion to rotate said film winding spool.

3. A one-time-use camera as recited in claim 2, wherein said spool end portion has an evenly spaced series of end-notches, and said endless belt has an inner side with an evenly spaced series of teeth that can be successively received in said notches to rotationally engage said spool end portion.

4. A one-time-use camera as recited in claim 3, wherein said film winding thumbwheel has a coaxial integral gear with an evenly spaced series of teeth that successively engage said teeth of said endless belt to rotate said endless belt when said film winding thumbwheel is manually rotated.

5. A one-time-use camera comprising:

a film cartridge with a single film winding spool that is rotatable to wind a filmstrip completely into said film cartridge by winding the filmstrip onto said film winding spool;

a manually rotatable film winding thumbwheel having an axis that is parallel to an axis of said film winding spool; and a rotatable endless belt having one axis that is coaxial with the axis of said film winding thumbwheel and another axis that is coaxial with the axis of said film winding spool, and rotationally engaging said film winding thumbwheel and said film winding spool to permit rotation of said thumbwheel to rotate said spool.

6. A one-time-use camera as recited in claim 5, wherein a main body part has a chamber containing said film cartridge and a top opening for said chamber, said film winding spool has an erect spool end portion that longitudinally extends through said top opening to project above said top opening, and said endless belt rotationally engages said spool end portion above said top opening.

7. A one-time-use camera as recited in claim 5, wherein the axis of said film winding thumbwheel is spaced sufficiently from the axis of said film winding spool to lie wholly beyond said film cartridge.

8. A one-time-use camera comprising:

a film cartridge with a film winding spool that is rotatable to wind a filmstrip completely into said film cartridge by winding the filmstrip onto said film winding spool;

a manually rotatable film winding thumbwheel having an axis that is parallel to an axis of said film winding spool and is spaced sufficiently from the axis of said film winding spool to lie wholly beyond said film cartridge; and a rotatable endless belt rotationally engaging said film winding thumbwheel and said film winding spool to permit rotation of said thumbwheel to rotate said spool.

* * * * *